United States Patent [19]
Smith

[11] 3,753,253
[45] Aug. 14, 1973

[54] MAGNETIC DOMAIN SWITCHING MATRIX AND CONTROL ARRANGEMENT

[75] Inventor: Robert McKee Smith, Holmdel, N.J.

[73] Assignee: Bell Telephone Laboratories Incorporated, Berkeley Heights, N.J.

[22] Filed: Sept. 13, 1971

[21] Appl. No.: 179,831

[52] U.S. Cl. 340/174 TF, 340/174 M, 340/174 SR, 340/174 VB, 340/174 ZA

[51] Int. Cl. ... G11c 11/14, G11c 5/02, G11c 19/00

[58] Field of Search ............................... 340/174 TF

[56] References Cited

UNITED STATES PATENTS

| | | | |
|---|---|---|---|
| 3,638,208 | 1/1972 | Chow | 340/174 TF |
| 3,678,287 | 7/1972 | Chow | 340/174 TF |
| 3,701,125 | 10/1972 | Genovese | 340/174 TF |
| 3,596,261 | 7/1971 | Perneski | 340/174 TF |

OTHER PUBLICATIONS

IBM Technical Disclosure Bulletin, Vol. 13, No. 11, Apr. 1971, pg. 3472–3473.

*Primary Examiner*—James W. Moffitt
*Attorney*—W. L. Keefauver

[57] ABSTRACT

A magnetic domain switching matrix arrangement is realized by a magnetically soft overlay geometry which controls the movement of single wall domains in a slice of magnetic material in response to a reorienting magnetic field. The overlay geometry defines a switching matrix for domains propagated along a horizontal path, which domains are selectively transferred to an intersecting vertical path under control of a domain positioned in proximity to the selected intersection between the respective paths. A separate control grid is utilized to position the control domain at the desired intersection point. Also realized are arrangements for controllably delaying and for selectively routing the control domains in accordance with information domains propagated in separate control channels in a flow chart arrangement.

20 Claims, 8 Drawing Figures

6 Sheets-Sheet 1

Patented Aug. 14, 1973 3,753,253

6 Sheets-Sheet 3

MAGNETIC DOMAIN SWITCHING MATRIX AND CONTROL ARRANGEMENT

BACKGROUND OF THE INVENTION

This invention relates to a switching arrangement for selectively controlling the establishment of information transferral paths and, more particularly, to such an arrangement utilizing single wall magnetic domain technology.

The controlled movement of single wall magnetic domains, or bubbles, in a slice of magnetic material in response to a reorienting magnetic field is taught by A. H. Bobeck in U.S. Pat. No. 3,460,116 issued Aug. 5, 1969. Typically, the movement of the domains is controlled by the juxtaposition of a magnetically soft overlay with a surface of the material in which the domains are propagated. The overlay elements are constructed in such a manner that different points become magnetically attractive at different magnetic field orientations thereby defining a path or channel which is followed by a domain. One such overlay, commonly referred to as a T and Bar overlay, is detailed in the above-mentioned Bobeck patent and is arranged to control the movement of magnetic domains in response to a reorienting magnetic field, illustratively having four quadrants, or reorientations, per cycle of rotation.

The usefulness of any such device depends upon the geometry of the respective elements with respect to each other. Thus the elements are advantageously arranged to take advantage of the fact that all domains in a slice of magnetic material under the influence of the same rotating field will propagate in that material in synchronous relationship with each other. Accordingly, domains which are propagated along different paths will arrive at certain points of the overlay in a predetermined coordinated relationship. This physical control of magnetic domains in spatial coordination coupled with the interaction forces between domains in close relationship with each other permits consecutive logic operations to be performed between cooresponding representations of different sets of information representations solely within magnetic domain technology if the representations are organized in a form to capitalize on those properties. One such organization which supplies signals representative of a change in status of any one of a number of telephone lines is illustrated in copending application Ser. No. 89,631 filed Nov. 16, 1970 of A. J. Perneski and R. M. Smith.

Taking advantage of the fact that the physical location of any magnetic domain in such a device is definable in terms of discrete preset element patterns, it is possible to organize the device to attain various logic or system functions. Thus, it is possible to organize magnetic domain channels into a matrix switching network where information is selectively transferred in, out, or through the network channel crosspoints in response to coincident domain propagation at the respective crosspoints. The particular information location is selectable entirely by magnetic domain technology when the matrix network is established in a uniform manner and when each crosspoint is responsive to domain coincidence thereat.

Accordingly, it is one object of my invention to take advantage of the time relationships as well as the spatial relationships which exist between magnetic domains in a manner allowing selective information control. More particularly, it is an object of my invention to establish a selectively controllable switching matrix utilizing magnetically soft overlay geometries for controlling the information transfer of single wall domains. It is still another object to utilize magnetic domains for the complete establishment of information paths through the switching matrix for the transfer or retrieval of information from the matrix.

It is a further object of my invention to provide a switching arrangement for controlling the establishment of selected paths through a switching matrix in accordance with information domains propagated for control purposes.

More specfically, it is an object of my invention to arrange magnetic domain control elements in a flow chart manner such that specific results may be obtained in accordance with information domains supplied to a transaction domain.

SUMMARY OF THE INVENTION

In one specific embodiment of my invention, I arrange domain control elements geometrically to define a switching matrix where domains propagated along a horizontal path are selectively transferred to an intersecting vertical path under control of a domain positioned at the selected intersection point between the respective paths of the switching matrix. A separate control grid is utilized to position the control domain and upon coincidence of domains in the respective paths of the control grid the control domain is positioned in proximity to the selected switching matrix intersection point.

For control purposes, each path of the matrix array is assigned a multidigit address designation, the digits of which are represented by domains on separate channels. Each digit is weighted such that the summation of the values of any address equals the position of the associated channel in the array. A transaction domain representing the horizontal channel is propagated along a first transaction channel and interacts with the address domains such that the transaction domain becomes delayed by the weighted address of the selected horizontal channel. Concurrently, a transaction domain representing the vertical channel is propagated along a second transaction channel and is delayed by the weighted address of the selected vertical channel. In this manner each transaction domain is coordinated in a time manner with the other transaction domain. These time-coordinated domains are then coordinated spatially by selective routing, under control of the address digits, to the respective horizontal or vertical channel.

Routing to the desired channel for each transaction domain is accomplished by an overlay geometry which defines an arrangement whereby each transaction domain is propagated from an input channel to one of a number of output channels dependent only upon the respective interactions between that domain and domains propagated along the address digit channels. The overlay is arranged in a flow chart format having a number of decision points. Each decision point corresponds to a domain interaction point and has at least two possible outputs therefrom. The input to each decision point consists of a transaction domain position and an auxiliary domain position. The interaction between domains in these positions serves to route the transaction domain to the next decision point for subsequent operation thereon.

In this illustrative embodiment, T and bar-shaped overlay elements are utilized to define the domain propagation channels and interaction points so that domains are propagated along the channels under control of the geometric structure of the elements and the repulsive forces of coincident domains all in response to a rotating in-plane field.

DESCRIPTION OF THE DRAWING

The operation and utilization of the present invention will be more fully apparent from the following description of the drawing in which.

Figure 6:
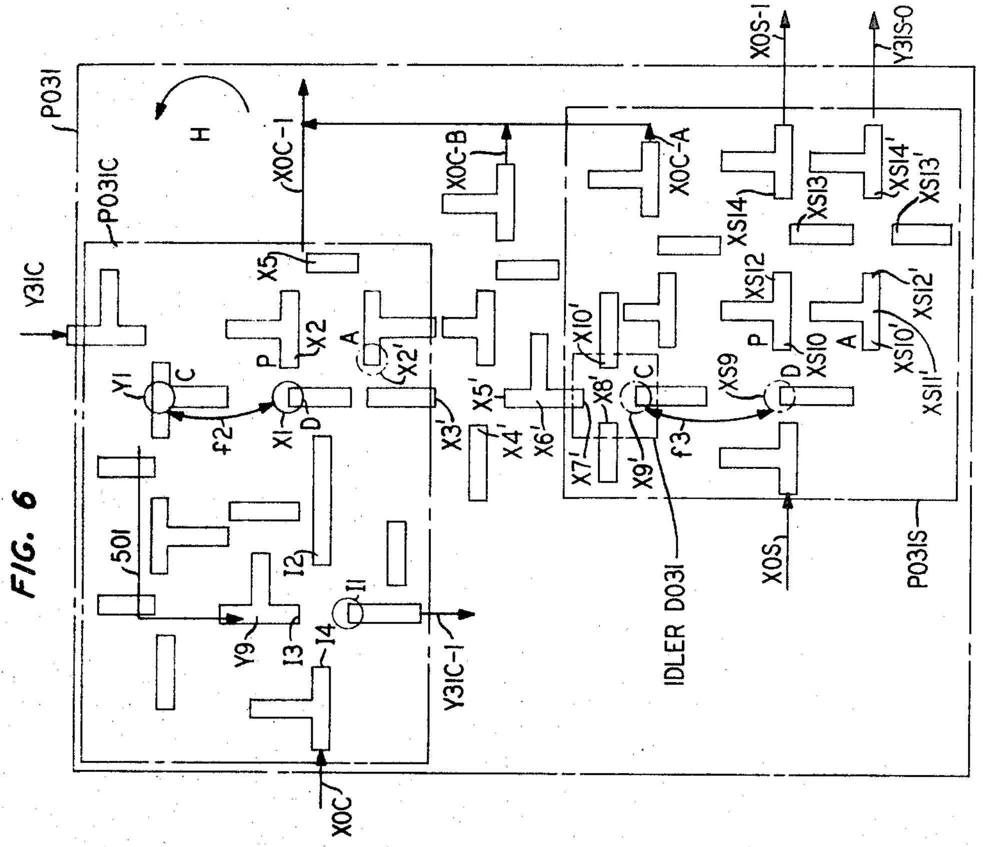
FIGS. 5, 6 and 7 are schematic drawings showing in greater detail the T and Bar arrangements for certain interaction points of the exemplary embodiments.

It will be noted that a systematic designation has been employed to illustrate the movement of domains from position to position and to facilitate a more complete understanding of the illustrative embodiment of the invention. Thus, a domain which is in a certain position at an arbitrary starting time is shown as a solid circle. As that domain moves from position to position along a defined channel of elements in response to a continuously changing magnetic field, broken circles are used for illustration. The letter associated with the position, such as letter X in FIG. 6, serves to identify the position and to identify any domain thereat. The number associated with each such letter at a specific position represents the number of that position counting from an arbitrary starting position. Thus, corresponding numbers between domains in separate channels having coordinated starting positions indicate synchronously coordinated positions between the channels. The prime sign (') is used to denote an alternate position for a domain in the associated time slot. Thus, as shown in FIG. 6, position X2 is the position in which the X domain will be on position after a starting position X1 if no force other than the force of the reorienting magnetic field is applied thereto. This path is called the preferred path of the domain and is marked symbolically by the letter P. When a domain encounters some other force, such as the repulsive force of a domain at a control point C (FIG. 6, position Y1), instead of moving from the decision point D (FIG. 6, position X1) to the preferred point P (FIG. 6, position X2) the X2 domain moves to the alternate point A (FIG. 6, position X2'). The movement into the prime channel is termed the alternate path of the domain.

Figure 2:
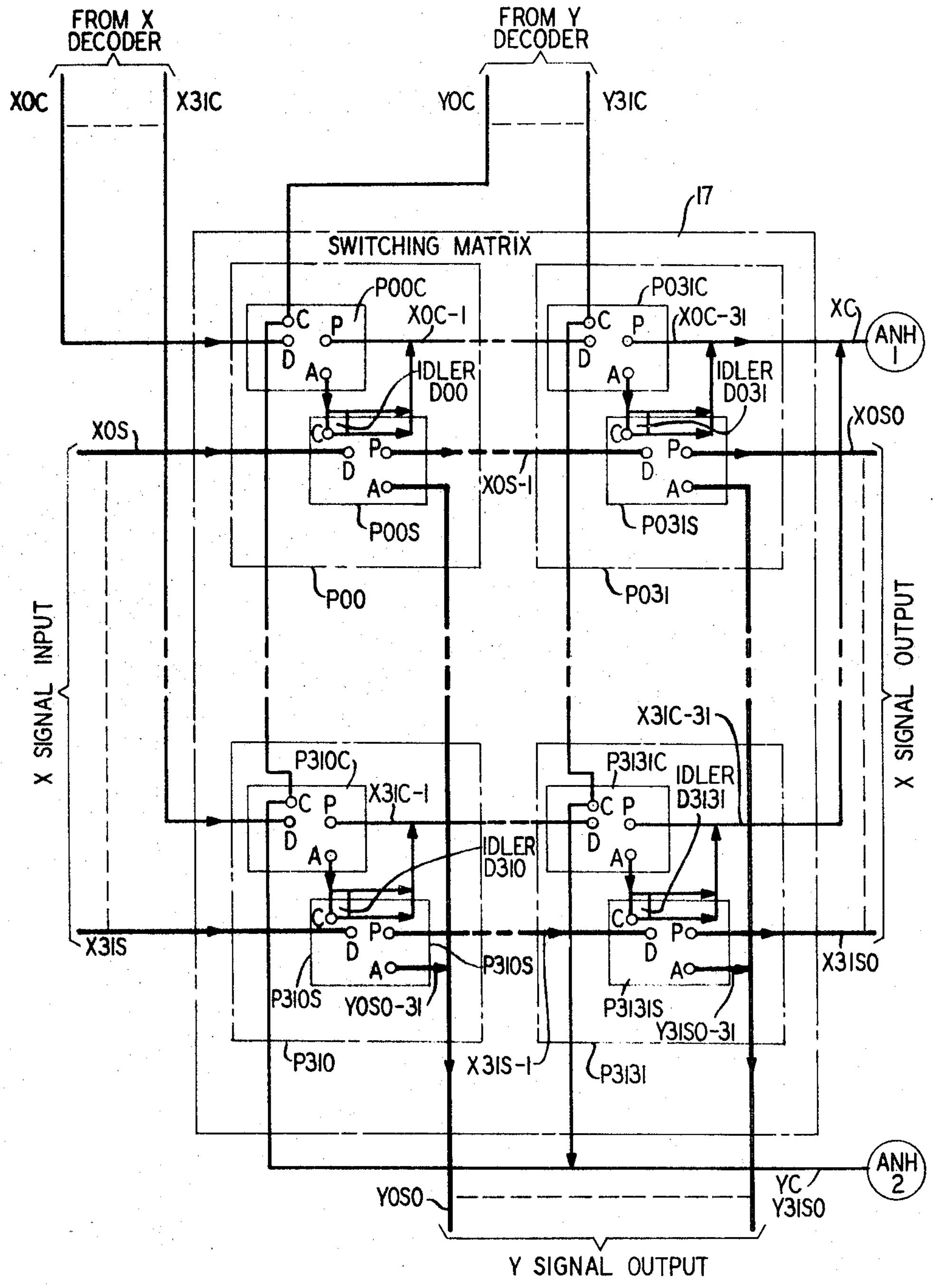
FIGS. 2, 3 and 4 are schematic representations showing the interrelationship between the interaction points of the magnetic domain circuit arrangements shown in block form in FIG. 1.
Figure 3:
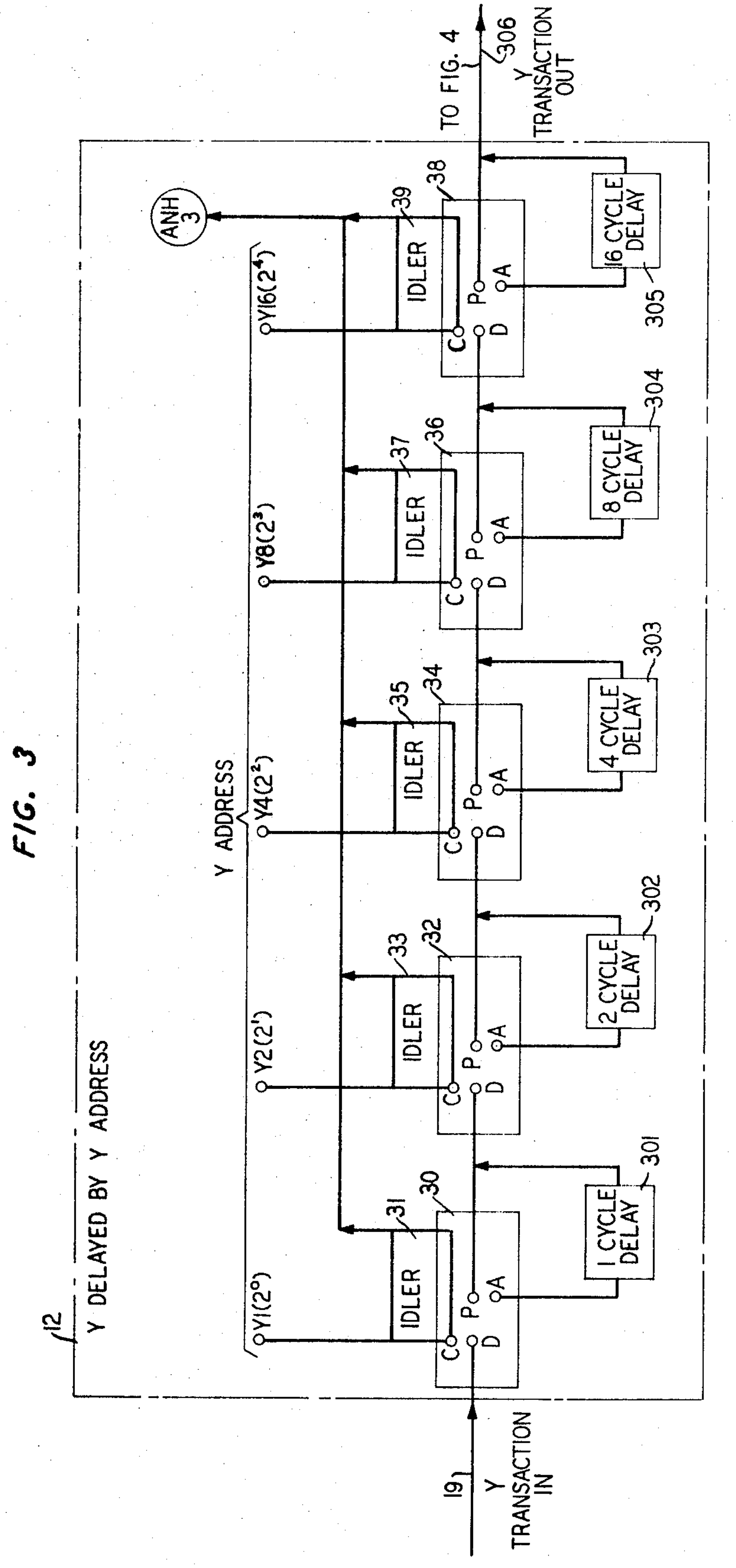
Figure 4:
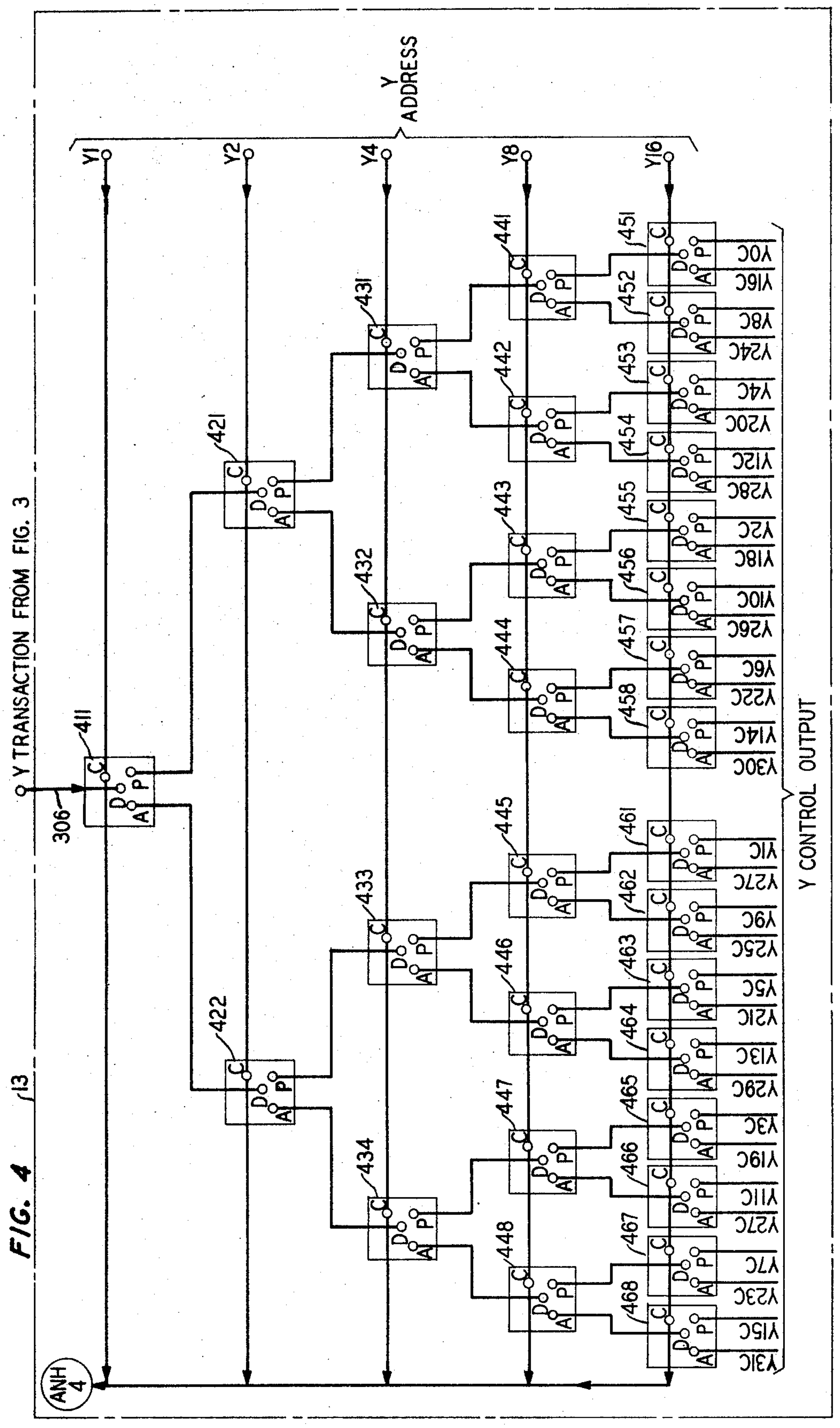

The A, D, P and C points of each interaction point are utilized, as shown in FIGS. 2, 3 and 4, to schematically represent the domain positions which are in coordinated relationship with each other to take advantage of the repulsive forces between domains. Thus, as shown with respect to interaction point POOC, FIG. 2, a small circle denotes point D which point represents the position of the domain at which a decision is required. Point P denotes the preferred position to which the domain from point D will move if no other force other than the force of a reorienting magnetic field is applied thereto. Point C denotes the position controlling the domain movement from point D such that when domains are concurrently at points C and D, the point D domain will move to the alternate position A at the next reorientation of the magnetic field. The precise manner in which the movement of domains at an interaction point such as at interaction point POOC is controlled will be discussed in more detail hereinafter.

GENERAL DESCRIPTION

Figure 1:
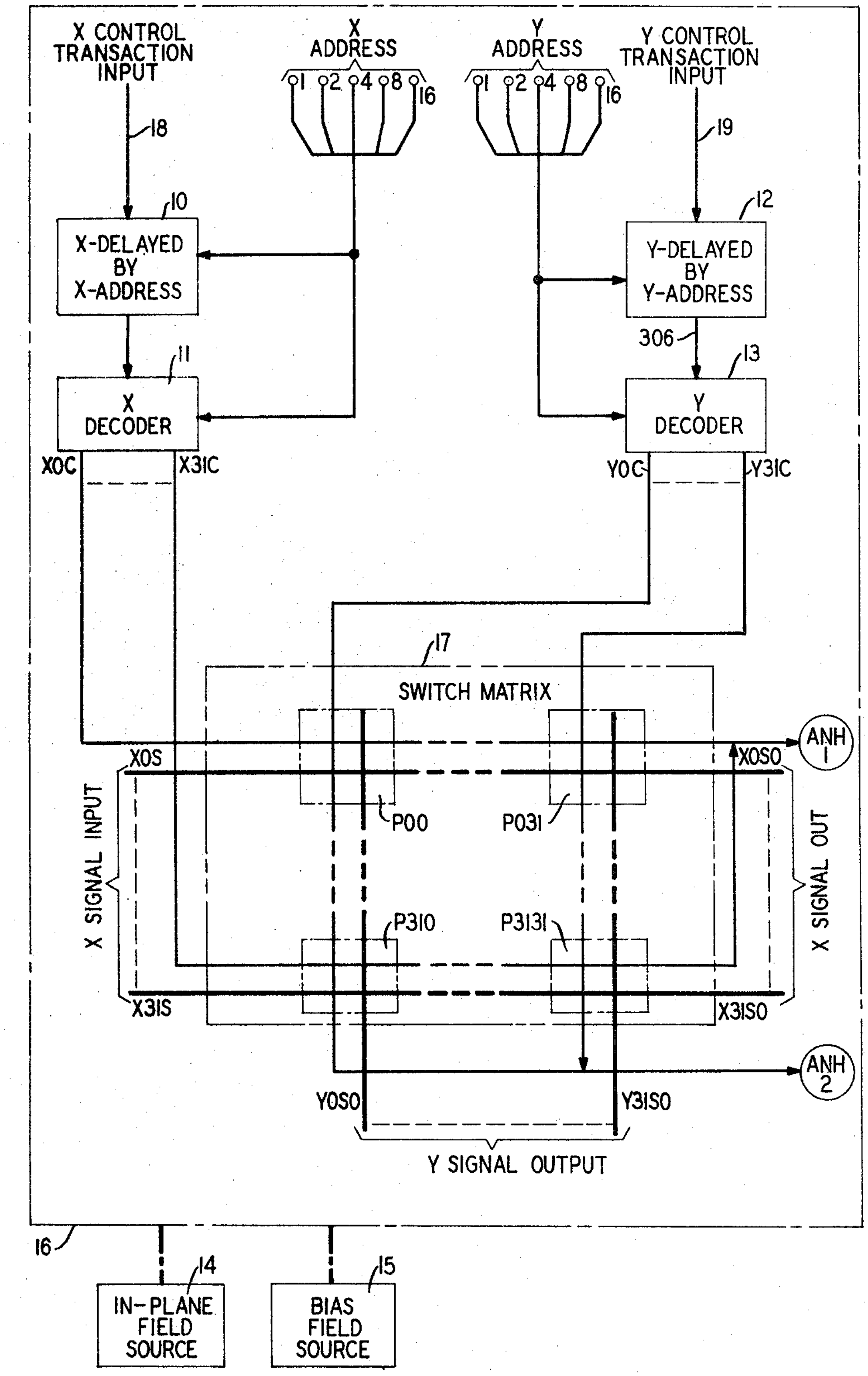
FIG. 1 is a schematic representation showing in block diagram form the interrelationship between the various circuit arrangements of the exemplary embodiment of the invention.

Turning now to FIG. 1, switch matrix 17 is shown with a plurality of horizontal signal input channels XOS to X31S intersecting a plurality of vertical signal output channels YOSO to Y31SO. In one embodiment of my invention, domains propagated along any of the X signal input channels will be selectively switched at one of the crosspoints POO-P3131 to one of the vertical channels under control of a domain recirculating at the selected crosspoint. A separate control grid is arranged with intersecting domain propagation channels XOC-X31C and YOC-Y31C in a manner such that each crosspoint of the control matrix is associated with a particular one of the crosspoints of the switching matrix. The crosspoint recirculating domain is controlled by the coincidence of domains at a particular crosspoint of the control matrix. Thus, with respect to crosspoint POO, a domain propagated along control channel XOC in coordinated relationship with a domain propagated along control channel YOC results in the recirculation of one of the control domains at crosspoint POO. As long as the control domain continues to recirculate within crosspoint POO, that crosspoint is closed and domains propagated along the respective horizontal signal channel XOS will be propagated out of the matrix along the associated vertical signal channel YOSO.

In an alternate embodiment of my invention, the switch matrix 17 may be utilized as a memory such that the recirculating control bits at the crosspoints in essence become data bits and may be read out of the crosspoint memory by coincident domain propagation along the respective control channels. Under such an arrangement, words or data bits would be written into the memory by coincident interaction between domains on the respective control channels of a selected crosspoint. For the write operation, the X signal input leads would become write control channels and a domain would be propagated along the selected channel to the crosspoint where a data bit is to be written. For example, if a data bit is to be written into location POO the control channels associated with that crosspoint would have domains coincident at crosspoint POO and the write control channel would also have a coincident domain at that crosspoint.

When the memory is to be read, the crosspoint desired is toggled by providing coincident domains thereat only on the control leads. If a domain had been written at the selected crosspoint and is recirculating thereat, that domain, upon coincidence of domains on the control channels, will be propagated out of the recirculating loop and become available for readout purposes. The precise manner in which the memory read and memory write functions are accomplished will be more fully detailed hereinafter.

An inherent problem which must be overcome in any switch matrix arranged for coincident interaction at respective crosspoints is the provision of domains along two channels in coordinated time relationship with each other and with a particular spatial relationship with the selected crosspoint of the matrix. In this respect, I take advantage of the fact that magnetic domains travel in a medium in controlled fashion and will arrive at a certain point at a particular time with respect to the arrival at another point of another domain. For example, assume that it is desired to establish coincidence at crosspoint PO31, which crosspont is 31 positions away from crosspoint POO in the same horizontal channel. Thus, it will be seen that a domain propagating along the XOC channel must pass through 31 crosspoints (not shown) prior to arriving at crosspoint PO31 while the Y control channel domain on channel Y31C passes through no crosspoints prior to arriving at crosspoint PO31. Thus, it is necessary to delay the Y transaction domain with respect to the X transaction domain by a factor corresponding to the time it takes the X domain to arrive at the desired coincident point. Thus, the control domain on channel Y31C must be delayed thirty-one positions with respect to the control domain on channel XOC. These delays are accomplsihed by circuit arrangements 10 and 12 in a manner to be more fully detailed hereinafter.

In addition to delaying the respective coordinated domains, it is necessary to propagate the delayed domains on the proper channel of the control matrix. Thus, in the case of the establishment of coincidence at crosspoint PO31, the X transaction domain must be propagated along channel XOC while the Y transaction domain must be propagated along channel Y31C. This spatial coordination is achieved by circuit arrangements 11 and 13 in a manner to be more fully detailed hereinafter.

DETAILED DESCRIPTION

Turning now to FIG. 1, let us assume that it is desired to establish a transferral of information propagated along the X signal input channel XOS to the Y signal output channel Y31SO. As shown, such information transfer would occur at crosspoint PO31, which crosspoint is the only crosspoint associated with both the horizontal channel XOS and the vertical channel Y31SO. Accordingly, in order to transfer information from the X channel to the Y channel at crosspoint PO31, coincidence must occur between a domain propagated on the X control channel XOC and the Y control channel Y31C such that a domain recirculates in idler DO31, thereby turning on crosspoint PO31.

Assume for a moment that such coincidence has occurred and that a domain is now recirculating in idler DO31. Under this situation, the recirculating domain would arrive at point C of interaction point PO31S of crosspoint PO31 once each cycle. When no other crosspoint in the same horizontal channel has a domain in its respective idler, a signal input domain propagated along channel XOS would move via points D and P (preferred path) of interaction point POOS of crosspoint POO and along channel section XOS-1 and via all intermediate crosspoints (not shown) to point D of interaction point PO31S of crosspoint PO31. Since it has been assumed that a domain is present at point C of idler DO31 during each cycle of the reorienting magnetic field, it follows that the point D information domain and the point C control domain exert a repulsive force on each other and the information domain is repelled along the alternate path via point A and thus propagates along Y signal output path Y31SO. The precise manner in which coincidence occurs between the information domain and the idler domain at interaction point PO31S will be detailed more fully hereinafter.

Summarizing briefly at this point, a domain has been positioned in idler DO31 of interaction point PO31 thereby enabling crosspoint PO31 for the transfer of information from an associated horizontal channel to an associated vertical channel of the crosspoint. Thus, information propagated along input channel XOS is subsequently propagated along output channel Y31SO. So long as the domain remains in the idler DO31, information will continue to be propagated along Y signal output channel Y31SO when information is propagated along X signal input channel XOS.

COINCIDENT CONTROL AT A CROSSPOINT

As discussed previously, upon coincidence between a domain propagated along an X control channel and a domain propagated along a Y control channel, a control domain will become trapped by an idler associated with the coincident point. Accordingly, with respect to coincidence at crosspoint PO31, the associated Y control channel domain will be at point C of interaction point PO31C when the X control channel domain is at point D thereof. Thus, the X channel domain moves via point A of interaction point PO31C and along the alternate path to idler DO31. That domain will continue to recirculate thereat until removed by a second coincidence of domains at interaction point PO31C.

The Y channel control domain, after passing through interaction point PO31C, will pass through all other crosspoints associated with the respective vertical multiple Y31C and thereafter pass into channel YC and become annihilated by annihilation device ANH2, which device may be arranged as detailed in U. S. Pat. No. 3,577,131, issued May 4, 1971 to R. H. Morrow and A. J. Perneski, and which annihilator functions to reduce any domain circulated thereto. In the event that the X channel control domain fails to be coincident with a Y channel control domain at any of the crosspoints associated with the respective horizontal multiple XOS that domain would pass through the preferred points of all crosspoints and then would move along channel XOC-31 and channel XC to annihilation device ANH1. A magnetic domain detector, such as the detector disclosed in U. S. Pat. No. 3,609,720 to W. Strauss, issued Sept. 28, 1971, may advantageously be positioned in channel XC to detect a failure to achieve coincidence which detection would signify that an error in operation is present. In similar manner, information propagated on any of the X signal input leads will pass through all crosspoints associated with the respective horizontal multiple if none of the respective idlers contain domains. Thus, the information on the input lead would then be propagated along the respective X signal output leads only when all crosspoints of the respective leads are open. Accordingly, advantageously placing detectors on each of these leads or combining all of the leads into a single output lead would yield an error signal if information domains are not switched to a vertical multiple within switching matrix 17.

ESTABLISHMENT OF COORDINATION BETWEEN CONTROL DOMAINS

Each of the respective crosspoints is given a 5-bit *X* binary address corresponding to the respective *X* horizontal channel and a 5-bit *Y* binary address corresponding to the respective vertical channel. Thus, crosspoint PO31 has an *X* address of 00000 and *Y* address of 11111. These respective binary addresses are translatable in the well-known manner such that $X = 0$ and $Y = 31$. Since, as discussed previously, the *X* control domain must pass through thirty-one crosspoints before arriving at crosspoint PO31 while the *Y* control domain passes through no crosspoints prior to arriving at crosspoint PO31, the *Y* control domain must be delayed 31 cycles if coincidence between the *X* and *Y* control domains is to be achieved at crosspoint PO31.

Turning again to FIG. 1 it should be noted that the *X* and *Y* control channels from the respective decoders 11 and 13, are constructed such that the distance between the *X* decoder 11 and the first crosspoint of each horizontal, such as crosspoint POO and P31O, equal the distance between the *Y* decoder 13 and the respective first crosspoints of the first horizontal, such as crosspoints POO and PO31. These respective distances therefore need not be taken account of in the delay circuits for coordination purposes. For example, when it is desired to close crosspoint POO, neither the *X* control domain nor the *Y* control domain need be delayed with respect to the other since coordination between these domains is built into the circuit paths. Thus, the binary address associated with crosspoint POO would be $X=00000$ and $Y=00000$. Since, as discussed above, the weighted binary address determines the delay in the example just quoted no delay would be present.

Also note that depending entirely upon the desired crosspoint operation either control channel may have to be delayed with respect to the other for proper time coordination. For example, assuming coincidence at crosspoint P31O the *X* address would be $X=11111$ and the *Y* address would be $Y=00000$. Thus, *X* would be delayed 31 positions behind *Y* since the *Y* transaction domain must pass through 31 crosspoints more than the *X* transaction domain. In the situation where some intermediate crosspoint (not shown) is selected for coincidence both the *X* and *Y* domains will be delayed and the total delay between the respective domains will depend upon the exact address selected. Thus, assume that it is desired to select an intermediate crosspoint in *X* channel XO5 and *Y* channel YO6, the respective addresses would be X-00101 and Y-00110. Accordingly, the net delay between the control channel domains would be one cycle. The exact manner in which such delays are achieved will now be discussed in detail.

Turning now to FIG. 3 and assuming the Y address of 11111, the Y delayed by Y address 12 will provide a domain on the Y transaction output channel 306 delayed from a domain arriving on the Y transaction input channel 19 by thirty-one cycles. At time zero a domain arrives along Y transaction input channel 19 to point D of interaction point 30. Since it has been assumed that the first bit position of the Y address is a "1," domains are propagated via point Y1 to idler 31 and point C thereof. Idler 31 as well as idlers 33, 35, 37 and 39 are arranged in the manner discussed previously for idler DO31 such that a domain recirculates through idler 31 and through point C once each cycle of the recirculating magnetic field. The domain in idler 31 continues to recirculate therearound until removed by the subsequent propagation of a domain through point Y1. Of course, in the situation where the address bits are represented by a continuous stream of domains the idlers would not be necessary.

Since it is assumed that a domain is present at point C of interaction point 30 coincident with the domain at point D thereof the point D domain follows the alternate path via point A and through one cycle delay circuit 301, which circuit may be arranged in any one of the well-known circuit configurations to cause a propagation delay between two coordinated points. In essence, delay circuit 301 is a domain propagation channel having an effective length one cycle longer between point A of interaction point 30 and point D of interaction point 32 than the effective length of the domain propagation channel between point P of interaction point 30 and point D of interaction point 32. Thus, the Y transaction input domain moving along channel 19 is propagated to point D of interaction point 32 one cycle behind the time when that domain would have been propagated to point D along the preferred path had a zero been the first digit of the Y address.

Again since idler 33 contains a domain at point C thereof (second Y address digit also "1") the transaction domain follows the alternate path and is delayed this time two cycles by 2-cycle delay 302. Thus the transaction domain arrives at point D of interaction point 34 delayed three cycles from a transaction domain following the shortest preferred path thereto. Again, since the Y4 bit of the Y address contains a "1" point C of interaction point 34 contains a domain. Thus, the transaction domain is delayed four cycles by 4-cycle delay circuit 303 and thus arrives at point D of interaction point 36 seven cycles delayed from a transaction domain following the shortest preferred path. Since the Y8 and Y16 paths of the Y address also contain "1s," the transaction domain is again delayed via the 8-cycle delay 304 and a 16 cycle delay circuit 305 and is thus moved to the Y transaction output channel 306 delayed a total of 31 cycles from a Y transaction input domain following the shortest preferred paths through the respective interaction points of circuit 12.

Again returning to FIG. 1, the Y transaction domain leaves circuit 12 delayed by 31 cycles while the X transaction domain is delayed by its respective address which in this case is zero delay. Thus, as the respective domains merge from the respective delay circuits 10 and 12 the Y transaction domain is coordinated thirty-one cycles behind the X transaction domain.

SPATIAL COORDINATION OF DOMAINS

At this point the respective X and Y transaction domains have been time coordinated with respect to each other and now these domains must each be routed to the proper channel of the respective input. Thus, the X transaction domain must be routed to channel XOC while the Y transaction domain must be routed to channel Y31C. The manner in which this coordination is accomplished will now be detailed.

Turning to FIG. 4, the Y transaction domain from the delay circuit, FIG. 3, is propagated via channel 306 to point D of interaction point 411. Since in the illustration the Y address contains all "1s," all of the channels Y1 through Y16 contain domains which domains are propagated through the respective C points of all the interaction points shown in Y decoder 13. Thus, at interaction point 411 the Y transaction domain at point D is repelled along the alternate path to point D of interaction point 422. Again the transaction domain is repelled along the alternate path to point D of interaction point 434. The transaction domain is again repelled along the alternate path to point D of interaction point 448 and again along the alternate path to point D of interaction point 468. The transaction domain is again repelled along the alternate path to Y control output path Y31C.

Remembering that the X address contains all "0s," the X transaction domain would follow the X transaction input (not shown but identical to the Y transaction input of FIG. 4) to point D of interaction point 411. Since the respective C points of all of the interaction points of the X decoder do not have domains thereat the X transaction domain follows all of the preferred paths via interaction points 411, 421, 431, 441 and 451 to X control output path XOC (not shown but identical to Y control output path YOC, FIG. 4).

Turning again to FIG. 1, the X transaction domain from X decoder 11 thus propagates along control channel XOC while the Y transaction control domain from Y decoder 13 propagates along Y channel Y31C. Since the Y transaction domain has been delayed from the X transaction domain 31 cycles these domains will arrive at crosspoint PO31 in coincidence for selectively controlling that crosspoint in accordance with the X address and Y address domains provided.

OPERATION OF INTERACTION POINTS

Figure 5:
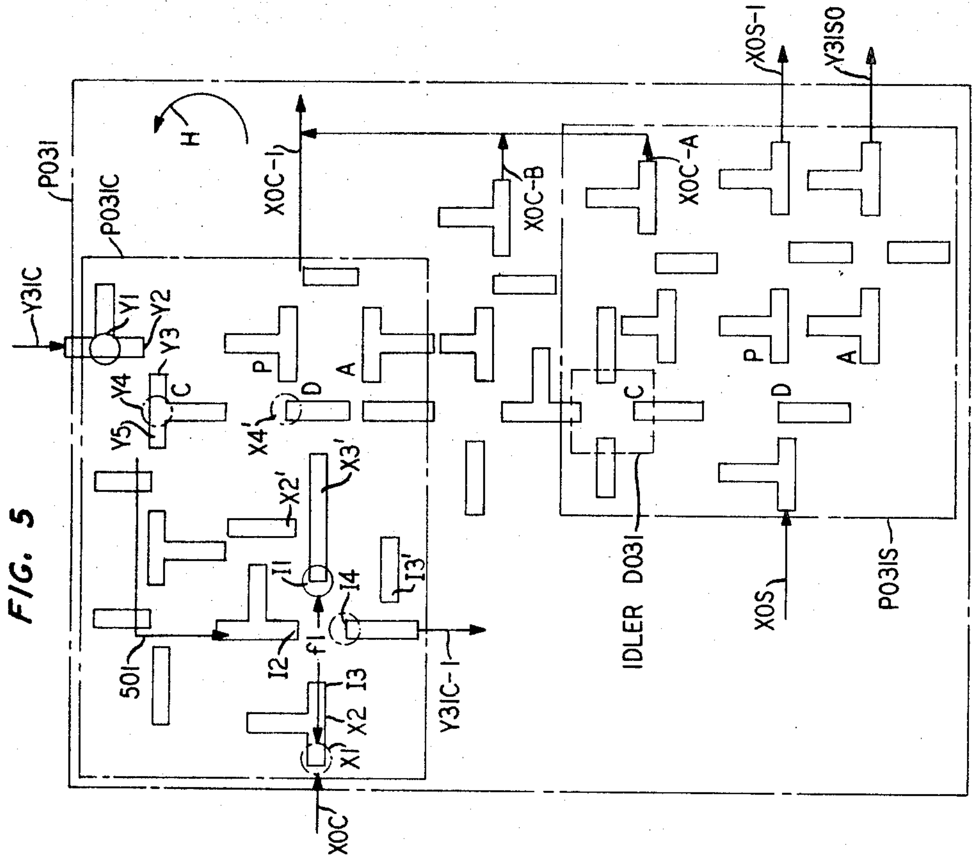

Prior to beginning a detailed discussion of the precise manner in which the various interaction points operate, it will be helpful to discuss briefly the operation of a crossover circuit where domain propagation channels intersect each other and domain propagation along either of the intersecting channels continues along the respective channel without interference from the other. Such a crossover circuit is shown in FIG. 5, and positions I1, I2, I3 and I4 are idler positions in which a magnetic domain, such as the domain shown in position I1, recirculates continuously therethrough in response to the reorienting magnetic field. Thus, at an arbitrarily selected first quadrant of the magnetic field the domain would be at position I1. During the second quadrant, the domain moves to position I2 then to position I3, I4, and back to position I1 during subsequent reorientation to the magnetic field. Thus, the I1 magnetic domain is trapped in the idler positions and will remain recirculating therein until some force other than reorienting magnetic field force moves the domain out of the idler position.

Now let us assume that the idler domain is in position I1 and a domain is propagated along the XOC channel to position X1. The X1 and I1 domains exert a mutually repulsive force, such as force $f1$, on each other such that at the next reorientation of the magnetic field the X1 domain moves to the X2 position and the I1 domain moves to the X2′ position and not to the I2 position as previously discussed. Thus the idler domain has moved out of the idler circuit and during subsequent reorientations in the magnetic field moves to positions X3′ and X4′. The XOC input domain moves from position X2 to position I3 and subsequently to position I4 of the idler circuit. During subsequent re-orientations of the magnetic field the XOC domain becomes the idler domain thereby continuing to recirculate through positions I1, I2, I3, and I4 in response to the orientations of the rotating magnetic field. In similar manner, a domain traveling along the Y31C input channel will follow arrow 501 to the crossover idler circuit and the idler domain will be repelled out along the channel defined by position I3′ to channel Y31C-1 and the domain arriving at the idler circuit along path 501 will become trapped in the idler circuit for recirculation therearound.

The precise manner in which the interaction points control the flow of domains will now be described with respect to crosspoint PO31 and the respective interaction points thereof. Accordingly, as shown in FIG. 6, assume that a domain has been propagated along the XOC input channel to position X1 now arbitrarily selected to be point D of interaction point PO31C. At the same time coincidence will be assumed at that interaction point and thus a domain will have been propagated along channel Y31C to position Y1 corresponding to point C of interaction point PO31C. The X1 domain at point D would move to the preferred point P shown as position X2 and out along channel XOC-1 if the Y1 domain was not present at point C. However, since point C contains a domain concurrently with the domain being positioned at point D a mutually repulsive force, such as force $f2$, is generated and the X1 domain moves at the next reorientation of the magnetic field from point D to point A, shown as position X2′. During subsequent reorientation of the magnetic field the domain at position X2′ moves through positions X3′, X4′, X5′, X6′ and becomes trapped in idler DO31 which idler consists of the domain positions X7′, X8′, X9′, and X10′. As previously discussed, idler DO31 is arranged so that once a domain becomes trapped therein that domain, in the absence of any force other than the reorienting magnetic force, will continue to recirculate through the idler positions. Thus, as discussed previously, coincidence of domains along the XOC and Y31C inputs to interaction point PO31C results in the XOC input domain being propagated to idler DO31 for circulation therearound.

Continuing in FIG. 6, channel XOS represents the information horizontal path input to crosspoint PO31 and channel XOS-1 represents the preferred path output while channel Y31S-0 represents the vertical output channel. Thus, information in the form of domains propagated along channel XOS when the crosspoint is set, i.e., a domain circulating in idler DO31, will result in domain propagation along the alternate path and along channel Y31S-0. This switching operation will now be discussed.

At some point in time information propagating along channel XOS moves to point D of interaction point PO31S. Thus, as shown, information domain XS9 is in coordinated relationship with the idler DO31 control domain X9′ such that a mutually repulsive force $f3$ is exerted therebetween. Accordingly, the XS9 domain follows the alternate path to position XS10′ for subsequent propagation along the vertical output channel Y31S-0 via positions XS11′, XS12′, XS13′ and XS14′. Subsequent domains propagated along in the XOS input will move under the control of the X9′ domain in idler DO31 for propagation along the Y31S-0 output.

Digressing momentarily, it should be noted that the D position of interaction point PO31S represents one possible position in which a domain may be at during the reorientations of the magnetic field. Since, in the illustrative embodiment it has been assumed that the rotating magnetic field has four quadrants, it follows that during any one of the quadrant phases the magnetic domains can only be at the point of the T and Bar structure providing a proper magnetic field for that quadrant. Thus, it is not possible to have domains at every position of a T and Bar structure but rather domains will always be separated by three positions. Therefore, when the idler DO31 domain is in a position other than the C position, position D of interaction point PO31S must be vacant since that point is not magnetically attracted to domains during the cycles of the reorientating magnetic field when the idler domain is in a position other than X9'.

REMOVAL OF A DOMAIN FROM THE IDLER CIRCUIT

Figure 7:
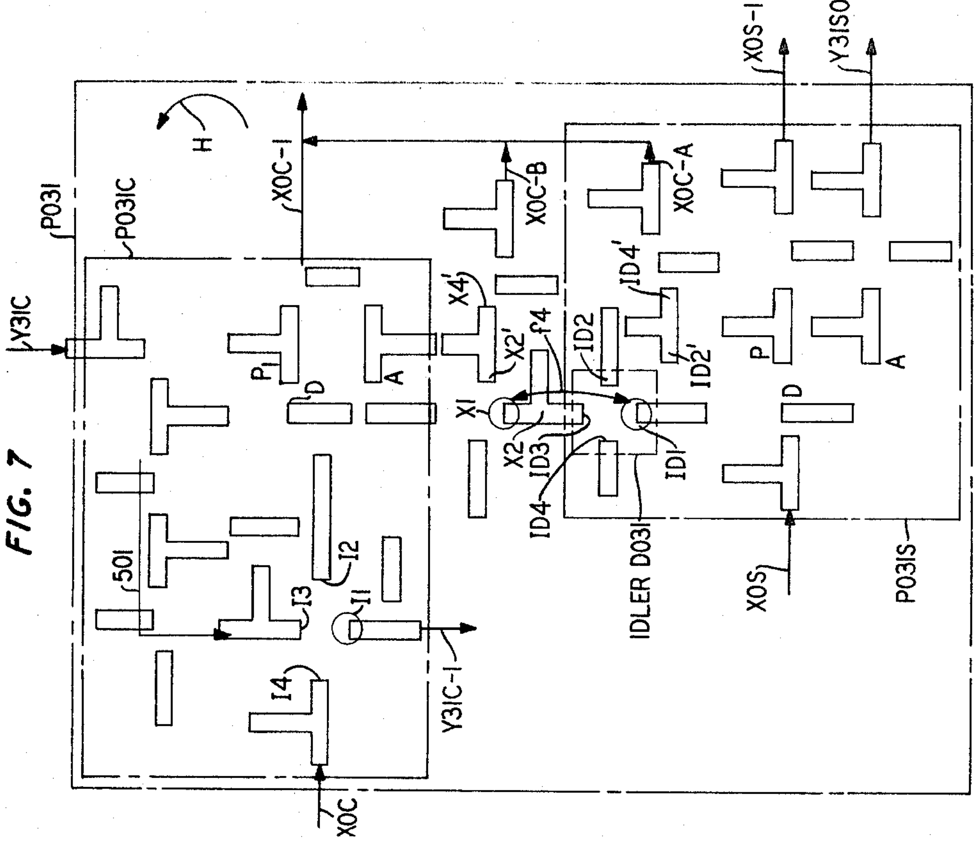

As discussed previously, a domain in the idler DO31 will continue to recirculate until subsequently removed by the propagation of a second domain thereto. This operation will now be detailed with respect to FIG. 7.

For convenience, the idler DO31 has now been labeled from an arbitrary starting position ID1 and consists of positions ID1, ID2, ID3, and ID4. Upon coincidence of domains propagated along the XOC and Y31C inputs to interaction point PO31C, the X domain in the manner discussed above arrives at position X1 and a repulsive force, such as force *f*4, is provided between the X1 domain and the idler ID1 domain. Under control of this repulsive force, the ID1 idler domain moves to an alternate position ID2' for subsequent propagation along channel XOC-A back to channel XOC-1. Concurrently therewith the X1 domain, under control of the same repulsive force *f*4, moves to its alternate position X2' and moves along channel XOC-B to channel XOC-1. Thus, the idler DO31 has been toggled such that when a domain is present therein s subsequently propagated domain removes the idler domain while at the same time not becoming trapped in the idler.

Summarizing briefly at this point, the operation of magnetic domains to form a matrix switching network under exclusive control of magnetic domain structures has been demonstrated. Information in the form of magnetic domains has been supplied to an input channel of the switching matrix and selectively propagated out of the matrix on a particular one of a number of channels intersecting the input channel. Selective control of the matrix has been accomplished by causing one domain of a set of coincident domains to become associated with the matrix crosspoint at which coincidence occurs. The associated domain remains at that crosspoint until domains are again coincident thereat. Upon such a second coincidence the crosspoint is toggled and the associated domain moves away from the coincident crosspoint and thus the crosspoint is effectively opened.

USE OF A MATRIX SWITCH AS A MEMORY DEVICE

Taking advantage of the toggling operation of the respective crosspoint idlers a memory arrangement can be constructed such that the propagation of a domain to an idler when no domain is present thereat results in a domain becoming trapped while the propagation of a domain thereto while a domain is currently trapped results in the idler position becoming vacant. The operation of such a device in conjunction with write control logic will now be discussed.

Figure 8:
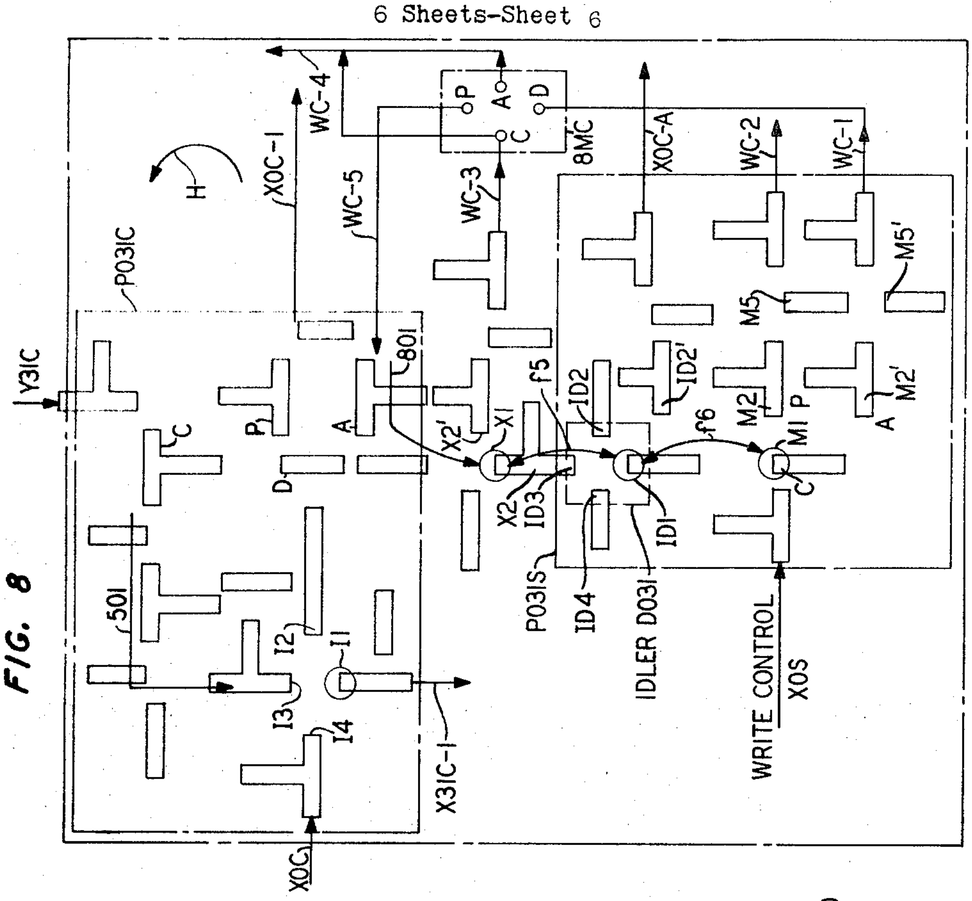
FIG. 8 is a schematic drawing showing in greater detail a T and Bar arrangement for a memory crosspoint.

Turning now to FIG. 8, assume that it is desired to read the status of idler DO31, and assume further that idler DO31 has an absence of a domain thereat. Accordingly, domains are propagated in a coincident manner along channel XOC and Y31C to interaction point PO31C and the XOC input domain, upon coincidence, is propagated to point X1 as discussed previously. Since idler DO31 is assumed vacant the X1 domain becomes trapped in idler DO31 for circulation therearound. Since no domain had been present therein no domain is forced out of the idler and thus channel XOC-A remains vacant. The vacant position of channel XOC-A is propagated past a readout head and at the appropriate time shows a logical "0," the status of selected idler DO31. Since idler DO31 has, in effect, been toggled, it now contains a domain. In situations where it is desired to preserve the status of the memory, the idler must again be toggled and thus domains must be propagated thereto coincidentally in successive cycles of the rotating magnetic field.

Assume now that idler DO31 contains a domain and again it is desired to determine the data bit associated therewith. In this situation, again a domain is propagated to point X1. Since a domain is present in idler DO31 force *f*5 is generated between these domains and the X1 domain follows alternate path X2' and along path WC-3 to interaction point 8MC and subsequently along path WC-4. At the same time the idler DO31 domain travels along its alternate path ID2' and along channel XOC-A to the output thereby signifying a logical "1" or the presence of a domain in idler DO31. Again idler D10 has been toggled and now contains a vacant position and upon the second coincidence at interaction point PO31C a domain is re-supplied to idler DO31 so that that idler will contain the same bit as it contained previous to the toggle operation.

MEMORY WRITE

When it is desired to write a data bit into a particular idler, such as into idler DO31, four situations must be considered, namely, write a "1" in the idler when a "0" is present, write a "1" into the idler when a "1" is present, write a "0" into the idler when a "0" is present, and write a "0" into the idler when a "1" is present.

The first of these situations where a "1" is written into an idler when a "0" is present has already been discussed such that a coincidence occurs between a domain along the XOC and Y31C inputs to interaction point PO31C and a domain is propagated along the positions X1 and X2 and into the idler positions. For writing purposes a separate control channel is also utilized which control channel is in essence the XOS input discussed previously with the exception now that domains propagated along the write control XOS input are delayed and steered to the desired crosspoint in the same manner as the X control domain and is supplied to that crosspoint in synchronism with the X control domain. To accomplish this function a write control transaction domain is utilized in the same manner as the X transaction control domain and delayed by the address associated with the X address of the desired crosspoint idler and spatially distributed also in accordance with the address location such that when a domain arrives at point X1 for propagation to idler DO31 a write control domain arrives at point M1. The purpose of this operation will now be discussed with reference to the second situation where a "1" must be read into the idler when a "1" is also present.

It will be recalled that in the absence of the write control M1 domain, if a "1" were to be propagated along the input to idler DO31 when a domain is present therein, idler DO31 would toggle resulting in the absence of a domain therein. Since in the write situation the purpose of providing a "1" is to write a "1" into the idler a method must be devised to maintain the idler domain within idler DO31. This is accomplished by propagating the write control domain to point M1 when the X control domain has arrived at point X1 such that when mutually repulsive force *f5* attempts to move the idler ID1 domain to point ID2′ a second repulsive force f6 is applied between domains M1 and ID1 such that the idler domain is forced to the ID2 position. The X1 domain however is moved to the X2′ position and propagates along channel WC-3 to point C of interaction point 8MC and the idler domain continues to recirculate in idler DO31.

Force f6 between the idler domain and the write control domain M1 repels the M1 domain to its alternate position M2′ for subsequent propagation along channel WC-1 to point D of interaction point 8MC. This channel length is selected so that the write control domain arrives at point D of interaction 8MC coincident with the X1 control domain arriving at point C thereof. Thus, in a situation where it is desired to write a "1" into idler DO31 and where a "1" already exists therein the X1 domain arrives at point C of interaction point 8MC concurrently with the arrival at point D of that interaction point of the M1 domain. The M1 domain then follows the alternate path and is propagated along channel WC-4. The purpose for interaction point 8MC will become clear from that which is contained hereinafter.

The third situation where a "0" is in idler DO31 and a "0" is to be writted in idler DO31 it is of course a simple situation in that no domain is present at position ID1 of idler DO31 and no domain is present in position X1. Therefore, idler DO31 remains vacant.

The situation where a domain is in idler DO31 and a "0" is desired to be written in is somewhat more complicated. The idler domain is at position ID1, when the write control domain is at position M1, the position X1 would be vacant (write "0") at that coordinated time. Thus, the idler domain, under force *f6* from the write control M1 domain, is propagated to position ID2 of idler DO31 for subsequent propagation therearound. At this point the idler domain continues to be in idler DO31 although it is desired to remove that domain therefrom. However, the M1 domain, experiencing repulsive force *f6* again moves along the alternate path WC-1 to interaction point 8MC. However, since the X1 position had been vacant the C point of interaction point 8MC is now vacant and the write control domain at point D passes through interaction point 8MC along preferred path WC-5 and back through the path shown by arrow 801 to position X1. Since, at this time the write control domain M1 is no longer present at point C of write control channel XOS, the idler domain ID1 is propelled, under control of repulsive force *f5*, along its alternate path XOC-A while the new X1 domain is propagated along the alternate path WC-3 through interaction point 8MC for subsequent propagation along channel WC-4. Thus, in a situation where idler DO31 had a domain therein and it is desired to write a "0," the write control domain accomplishes this purpose by removing the idler domain from idler DO31.

It should be noted that in the event no domain is in idler DO31 and it is desired to maintain that status the write control domain does not enter the idler position in the manner just described since the write control domain arriving at position M1 will not interact with the idler DO31 domain and thus will pass along its preferred path and along channel WC-2 and bypass interaction point 8MC entirely.

CONCLUSION

While the equipment of the invention has been shown in a particular embodiment wherein a matrix array of information control elements have been selectively operated by coincident control of data bits propagated over intersecting paths it is to be understood that such an embodiment is intended only to be illustrative of the present invention and numerous other arrangements may be devised by those skilled in the art without departing from the spirit and scope of my invention.

For example, the switching matrix may contain any number of rows or columns and the number of such rows need not equal the number of columns. In addition, for convenience herein the matrix has been assumed to be regular with horizontal inputs and vertical outputs. Of course, the matrix network could be designed to function in exactly the opposite manner or in fact could be designed with all horizontal or all vertical multiples such that information transfer could occur at specific points where coincidence of signals on two different channels is achieved.

What is claimed is:

1. An arrangement for selectively transferring information from any one of a number of horizontal information paths to any one of a number of vertical information paths, said information transfer occurring at respective intersections between said horizontal and vertical information paths, said arrangement comprising a control network having horizontal control paths equal in number to the number of said horizontal information paths and vertical control paths equal in number to the number of said vertical information paths, each intersection between one of said horizontal control paths and one of said vertical control paths being associated with a unique one of said information transfer intersections, each said horizontal control path and vertical control path being definable in terms of an address individually associated therewith, means for establishing a signal on any of said horizontal control paths, means for establishing a signal on any of said vertical control paths, means for selectively coordinating an established horizontal control signal with an established vertical control signal and with any one of said control network intersections such that each said established horizontal path signal will be coincident with each said established vertical path signal at a particular one of said control network intersections, means controlled by a first coincidence of said signals at one of said control network intersections for enabling the transfer of information from a horizontal information path to a vertical information path at said information transfer intersection associated with said one control network intersection, means controlled by a second coincidence of said signals at said one of said control network intersections for inhibiting the transfer of said information through said associated information transfer intersection, control means for selectively establishing an enabled or an inhibited condition at a selected one of said information transfer intersections without regard to the prior status of said selected information transfer intersection, said selective control means including means for establishing a signal on any one of said horizontal information paths, and means for selectively coordinating an established horizontal information signal with an established horizontal control signal and with said selected information transfer intersection such that each of said coordinated signals will be coincident thereat, means for supplying coded representations of said addresses associated with selected ones of said control network intersection points, and means for providing a pair of coordinated transaction signals one signal of said pair representing said horizontal control path and the other signal of said pair representing said vertical control path, said horizontal control path signal establishing means including means controlled by a supplied coded representation of said horizontal address for delaying said horizontal transaction signal, and said vertical control path signal establishing means including means controlled by a supplied coded representation of said vertical address for delaying said vertical transaction signal.

2. The invention set forth in claim 1 wherein said selective coordinating means includes means for steering said delayed horizontal transaction signal in accordance with said supplied coded representation of said horizontal address to said horizontal control path associated therewith, and means for steering said delayed vertical transaction signal in accordance with said supplied coded representation of said vertical address to said vertical control path associated therewith.

3. In a slice of material in which single wall domains can be moved in response to a magnetic field reorienting in the plane of said slice, an overlay of magnetically soft material juxtaposed with a surface of said slice, said overlay defining an arrangement for time coordinating a domain in order to achieve coincidence of that domain with another time coordinated at a particular intersection of an information transfer device, said arrangement comprising a transaction channel for receiving a domain to be time coordinated, a plurality of delay arrangements for delaying a domain propagated along said transaction channel, and a plurality of auxiliary channels, each having a domain interaction point common with said transaction channel and common with a unique one of said delay arrangements, each said interaction point operable for transferring said transaction channel domain to said associated delay arrangement under control of a domain propagated along said associated auxiliary channel.

4. The invention set forth in claim 3 wherein each said intersection is definable in terms of an address individually associated therewith and wherein each said auxiliary channel is associated with a particular bit of a coded representation of said address.

5. An arrangement for selectively transferring information from any one of a number of horizontal information paths to any one of a number of vertical information paths, said information transfer occurring at respective intersections between said horizontal and vertical information paths, said arrangement comprising a control network having horizontal control paths equal in number to the number of said horizontal information paths and vertical control paths equal in number to the number of aid vertical information paths, each intersection between one of said horizontal control paths and one of said vertical control paths being associated with a unique one of said information transfer intersections, each said horizontal control path and vertical control path being definable in terms of an address individually associated therewith, means for establishing a signal on any of said horizontal control paths, means for establishing a signal on any of said vertical control paths, means for selectively coordinating an established horizontal control signal with an established vertical control signal and with any one of said control network intersections such that each said established horizontal path signal will be coincident with each said established vertical path signal at a particular one of said control network intersections, means controlled by a first coincidence of said signals at one of said control network intersections for enabling the transfer of information from a horizontal information path to a vertical information path at said information transfer intersection associated with said one control network intersection, means controlled by a second coincidence of said signals at said one of said control network intersections for inhibiting the transfer of said information through said associated information transfer intersection, and a geometry of elements adapted for controlling the directional movement of magnetic domains in a slice of material in response to a magnetic field reorienting in a plane of said slice, wherein said selective coordinating means includes a transaction network of channels comprising an input channel, a plurality of intermediate channels and a plurality of output channels, each said output channel associated with one of said auxiliary control network paths, and a plurality of other channels each having at least one domain interaction point common with each of said transaction channels, said common points between said other channels and said transaction channel arranged such that a domain propagated along said input transaction channel will be propagated along said intermediate transaction channels in a manner determined by the respective interactions between said domain and domains propagated along said other channels and will thereby be propagated along a unique one of said output channels dependent only upon said interactions.

6. The invention set forth in claim 5 wherein said horizontal and vertical signal establishing means each includes a transaction channel associated with each said horizontal and vertical established signals, each said transaction channel including a plurality of delay arrangements for delaying a domain propagated along said transaction channel representative of said established signal, and $n$ interaction points, each for transferring said transaction domain to a unique one of said delay circuits under control of domains propagated along unique ones of said other channels.

7. An arrangement for selectively transferring information bits from any one of a number of horizontal information positions to any one of a number of vertical information paths, said information transfer occurring at respective intersections between said horizontal information positions and said vertical information paths each said information transfer intersection being definable in terms of a horizontal and vertical address, said arrangement comprising a control network having horizontal control paths associated with said horizontal information positions and vertical control paths associated with said vertical information paths, each intersection between one of said horizontal control paths and one of said vertical control paths being associated with a unique one of said information transfer intersections, means for supplying coded representations of said addresses associated with selected ones of said control network intersection points, means for providing a pair of coordinated transaction signals one signal of said pair representing said horizontal control path and the other signal of said pair representing said vertical control path, means for establishing a signal on any of said horizontal control paths, said means including means controlled by a supplied coded representation of said horizontal address for delaying said horizontal transaction signal, means for establishing a signal on any of said vertical control paths, said means including means controlled by a supplied coded representation of said vertical address for delaying said vertical transaction signal, means for selectively coordinating an established horizontal control signal with an established vertical control signal and with any one of said control network intersections such that each said established horizontal path signal will be coincident with each said established vertical path signal at a particular one of said control network intersections, and means controlled by a first coincidence of said signals at one of said control network intersections for enabling the transfer of an information bit from a horizontal information position to a vertical information path at said information transfer intersection associated with said one control network intersection and for toggling said information bit contained thereat.

8. The invention set forth in claim 7 wherein said selective coordinating means includes means for steering said delayed horizontal transaction signal in accordance with said supplied coded representation of said horizontal address to said horizontal path associated therewith, and means for steering said delayed vertical transaction signal in accordance with said supplied coded representation of said vertical address to said vertical path associated therewith.

9. The invention set forth in claim 7 further comprising means controlled by a second coincidence of said signals at said one of said control network intersections for again enabling the transfer of an information bit from a horizontal information position to a vertical information path at said information transfer intersection associated with said one control network intersection and for toggling said information bit contained thereat.

10. The invention set forth in claim 9 further comprising control means for selectively establishing a first information bit or a second information bit at a selected one of said information transfer intersections without regard to the prior information bit contained at said selected information transfer intersection, said selective control means including a plurality of horizontal information paths equal in number to said number of horizontal control paths, each horizontal information path associated with one said horizontal control paths, means for establishing a signal on any one of said horizontal information paths, and means for selectively coordinating an established horizontal information signal with an established horizontal control signal and with said selected information transfer intersection such that each of said coordinated signals will be coincident thereat.

11. The invention set forth in claim 7 wherein said arrangement comprises a geometry of elements adapted for controlling the directional movement of magnetic domains in a slice of material in response to a magnetic field reorienting in a plane of said slice, wherein said selective coordinating means includes a transaction network of channels comprising an input channel, a plurality of intermediate channels and a plurality of output channels, each said output channel associated with one of said auxiliary control network channels, a plurality of other channels each having at least one domain interaction point common with each of said transaction channels, said common points between said other channels and said transaction channel arranged such that a domain propagated along said input transaction channel will be propagated along said intermediate transaction channels in a manner determined by the respective interactions between said domain and domains propagated along said other channels and will thereby be propagated along a unique one of said output channels dependent only upon said interactions.

12. The invention set forth in claim 11 wherein said horizontal and vertical delay controlling means each includes a plurality of auxiliary domain propagation channels, each for propagating domains representative of one bit of said transfer intersection address, a plurality of delay arrangements for delaying a domain propagated along said transaction channel representative of said established signal, and

*n* interaction points, each for transferring said transaction domain to a unique one of said delay circuits under control of domains propagated along unique ones of said auxiliary channels.

13. A slice of material in which single wall domains can be moved in response to a magnetic field reorienting in the plane of said slice and an overlay of magnetically soft material juxtaposed with a surface of said slice, said overlay defining a first grid of intersecting channels having horizontal and vertical paths, a second grid of intersecting channels having horizontal and vertical paths, each second grid intersection point being uniquely associated with one of said first grid intersection points, each said second grid intersection point arranged such that upon a coincidence of domains thereat one of said coincident domains is transferred to said associated first grid intersection point so that domains propagated along a horizontal path to said first grid intersection point will propagate along said vertical path from said first grid intersection point under control of said transferred domain.

14. The invention set forth in claim 13 wherein each said second grid intersection point is further arranged such that upon a second coincidence of domains thereat one of said second coincident domains is transferred to said associated first grid intersection point for interaction with said first coincident transferred domain so that domains propagated along a horizontal path to said first grid intersection point will be inhibited from propagation along said vertical path from said first grid intersection point.

15. The invention set forth in claim 14 wherein said overlay further defines an arrangement for providing coincident domains at selected intersection points of said second grid, each said horizontal and vertical path of said second grid definable in terms of an address associated therewith, auxiliary paths for supplying domains representative of said addresses associated with selected ones of said second grid intersection points, a pair of transaction channels for supplying transaction domains, one domain of said pair representing said second grid horizontal paths and the other domain of said pair representing said second grid vertical paths, and delay elements associated with each transaction channel, each element operable in response to domains supplied over one of said auxiliary paths for delaying each transaction domain an amount determined by the respectively associated address domains supplied over said auxiliary channels.

16. The invention set forth in claim 15 wherein each said transaction channel includes an input channel, a plurality of intermediate channels and a plurality of output channels, a plurality of interaction points between said auxiliary channels supplying said address domains and each said transaction path, said interaction points arranged such that a domain propagated along said input channel of said transaction path will be subsequently propagated through said intermediate transaction channels in a manner controlled by the respective interactions between said transaction channel domain and said supplied address domains and will thereby be propagated along a unique one of said output channels dependent only upon said interactions.

17. A geometry of elements adapted for controlling the directional movement of magnetic domains in a slice of material in response to a magnetic field reorienting in a plane of said elements said element defining a first matrix array of intersecting channels having *n* horizontal channels and *m* vertical channels, nxm interaction points, each uniquely associated with one of said intersections of said first matrix array, a transaction channel associated with said horizontal channels, said transaction channel having a single input and *n* outputs, each of said outputs associated with a particular one of said horizontal channels, a transaction channel associated with said vertical channels, said transaction channel having a single input and *m* outputs, each said output associated with a particular one of said vertical channels,

*p* first auxiliary channels, where *p* is the number of bits necessary to define *n* in binary format, each one of said first auxiliary channels having at least one interaction point with said horizontal transaction channel and arranged in conjunction therewith such that a domain moving along said horizontal transaction channel from said input will move to one of said outputs under control of domains moving along said first auxiliary channel, and

*q* second auxiliary channels, where *q* is the number of bits necessary to define *m* in binary format, each one of said second auxiliary channels having at least one interaction point with said vertical transaction channel and arranged in conjunction therewith such that a domain moving along said vertical transaction channel from said input will move to one of said outputs under control of domains moving along said second auxiliary channel.

18. The invention set forth in claim 17 wherein said elements further define

*p* delay arrangements each associated with one of said first auxiliary channels and arranged in conjunction with said horizontal transaction channel such that said transaction domain passes serially through said delay arrangements under control of domains moving along said first auxiliary channels, and

*q* delay arrangements each associated with one of said second auxiliary channels and arranged in conjunction with said vertical transaction channel such that said transaction domain passes serially through said delay arrangements under control of domains moving along said second auxiliary channels.

19. In a slice of material in which single wall domains can be moved in response to a magnetic field reorienting in the plane of said slice, an overlay of magnetically soft material juxtaposed with a surface of said slice, said overlay defining an arrangement for spatially distributing a domain in order to achieve coincidence of that domain with another spatially distributed domain at a particular intersection of an information transfer device, said arrangement comprising a transaction network of channels comprising an input channel for receiving a domain to be spatially distributed, a plurality of intermediate channels and a plurality of output channels, a plurality of auxiliary channels each having a domain interaction point with at least one of said transaction channels, said interaction points between said auxiliary channels and said transaction channels arranged such that a domain propagated along said input transaction channel will be propagated through said intermediate transaction channels in a manner determined by the respective interactions between said transaction channel domain and domains propagated along said auxiliary channel and will thereby be propagated along a unique one of said output channels dependent only upon said interactions.

20. The invention set forth in claim 19 wherein each said intersection is definable in terms of an address individually associated therewith an wherein each said auxiliary channel is associated with a particular bit of a coded representation of said address.

* * * * *

UNITED STATES PATENT OFFICE
CERTIFICATE OF CORRECTION

Patent No. 3,753,253 Dated August 14, 1973

Inventor(s) Robert McKee Smith

It is certified that error appears in the above-identified patent and that said Letters Patent are hereby corrected as shown below:

Column 1, line 40, change "cooresponding" to --corresponding--.

Column 3, line 47, after "be" and before "position" change "on" to --one--.

Column 5, line 38, after "FIG." change "1" to --2--.

Column 11, line 41, after "therein" change "s" to --a--.

Column 12, line 38, change "D10" to --D031--.

Column 13, line 43, change "writted" to --written--.

Column 16, line 21, change "aid" to --said--.

Column 20, line 5, after "of" and before "said" insert --each--; line 16, "elements" should read -- slice, -- and "element" should read -- elements -- .

Signed and sealed this 22nd day of January 1974.

(SEAL)
Attest:

EDWARD M. FLETCHER, JR.
Attesting Officer

RENE D. TEGTMEYER
Acting Commissioner of Patents

148